United States Patent [19]

Shaw et al.

[11] Patent Number: 4,801,189

[45] Date of Patent: Jan. 31, 1989

[54] BIREFRINGENT FIBER NARROWBAND POLARIZATION COUPLER AND METHOD OF COUPLING USING SAME

[75] Inventors: Herbert J. Shaw, Stanford; Robert C. Youngquist; Janet L. Brooks, both of Mountain View, all of Calif.

[73] Assignee: The Board of Trustees of the Leland Stanford Junior University, Stanford, Calif.

[21] Appl. No.: 161,375

[22] Filed: Feb. 22, 1988

Related U.S. Application Data

[63] Continuation of Ser. No. 556,305, Nov. 30, 1983.

[51] Int. Cl.$^4$ ............................ G02B 6/26; G02B 5/30
[52] U.S. Cl. ................................ 350/96.15; 350/96.29; 350/96.30; 350/320; 350/371
[58] Field of Search ............... 350/96.10, 96.12, 96.14, 350/96.13, 96.15, 96.16, 96.29, 96.30, 370, 371, 374, 384, 358, 320

[56] References Cited

U.S. PATENT DOCUMENTS

| | | | |
|---|---|---|---|
| 3,645,603 | 2/1972 | Smith | 350/371 |
| 4,019,051 | 4/1977 | Miller | 350/96.15 |
| 4,153,328 | 5/1979 | Wang | 350/96.15 |
| 4,253,727 | 3/1981 | Jeunhomme et al. | 350/96.15 |
| 4,341,442 | 7/1982 | Johnson | 350/96.15 |
| 4,342,907 | 8/1982 | Macedo et al. | 250/227 |
| 4,666,235 | 5/1987 | Pavlath | 350/96.15 |
| 4,666,255 | 5/1987 | Taylor et al. | 350/371 |
| 4,684,215 | 8/1987 | Shaw et al. | 350/96.29 |
| 4,725,124 | 2/1988 | Taylor | 350/96.29 |
| 4,735,485 | 4/1988 | Shaw et al. | 350/96.29 |
| 4,741,586 | 5/1988 | Kim et al. | 350/96.15 |
| 4,749,246 | 6/1988 | Epworth et al. | 350/96.15 |

FOREIGN PATENT DOCUMENTS

| | | | |
|---|---|---|---|
| 6234480 | 9/1980 | Australia | 250/227 |
| 3006102 | 8/1980 | Fed. Rep. of Germany | 350/96.15 |
| 3013335 | 10/1981 | Fed. Rep. of Germany | 350/96.15 |
| 52-54450 | 5/1977 | Japan | 350/96.15 |

OTHER PUBLICATIONS

Ohashi et al., "Phase-Matched Light Amplification . . . ", Appl. Phys. Lett., 12/82, vol. 41, No. 12, pp. 1111–1113.

Ulrich et al., "Polarization Stabilization . . . ", Appl. Phys. Lett., 12/79, vol. 35, No. 11, pp. 840–842.

Rashleigh et al., "Preservation of Polarization in Single-Mode Fibers", Fiberoptic Technology, May. 1983, pp. 155–161.

Alferness et al., "Tunable Electro-Optic Waveguide . . . Fiber", Applied Physics Letters, vol. 40, No. 10, 15 May 1982, pp. 861–862.

Goto et al., "Optical Switching Characteristics . . . Acoustic Waves", Transactions of the IECE of Japan, vol. E66, No. 7, Jul. 1983, pp. 442–449, Tokyo.

Jeunhomme et al., "Directional Coupler for Multimode Optical Fibers", Applied Physics Letters, vol. 29, No. 8, 15 Oct. 1976, pp. 485–487.

Heismann et al., "Integrated-Optical Single-Sideband . . . ", IEEE Transactions on Microwave Theory and Techniques, vol. MTT-30, No. 4, Apr. 1982, pp. 613–617.

(List continued on next page.)

Primary Examiner—William L. Sikes
Assistant Examiner—Brian M. Healy
Attorney, Agent, or Firm—Knobbe, Martens, Olson & Bear

[57] ABSTRACT

There is disclosed herein a fiber optic directional coupler for coupling light between two polarization modes. A highly birefringent fiber optic waveguide is positioned on a flat polished surface with either of the principal axes of birefringence oriented at an angle, preferably 45°, to the vertical. A ridged block is then pressed down on the fiber. The ridges of the block have longitudinal axes transverse to the longitudinal axis of the fiber. The width of the ridge faces is one-half beat length, and the spacing between the ridges in also one-half beat length. The stressed regions caused by the ridges cause coupling of light traveling in one polarization mode into the other polarization mode by abrupt shifting of the axes of birefringence at the boundaries of the stressed regions.

34 Claims, 4 Drawing Sheets

OTHER PUBLICATIONS

Yariv, "Coupled-Mode Theory for Guided-Wave Optics", *IEEE Journal of Quantum Electronics*, vol. QE-9, No. Sep. 1973, pp. 919-933.

Chinone et al., "Electro-Optic Polarization Measurement in Optical Fiber", *Optics Letters*, vol. 6, No. 1, Jan. 1981, pp. 16-18.

Miller, "On Solutions for Two Waves with Periodic Coupling", *The Bell System Technical Journal*, Oct., 1968, pp. 1801-1822.

Katsuyama, "Single-Mode Propagation in 2-Mode Region of Optical Fibre by Using Mode Filter", *Electronics Letters*, vol. 15, 1979, pp. 442-444.

Harris et al., "Acousto-Optic Tunable Filter", J. of the Optical Society of the America, vol. 59, No. 6, Jun. 1969, pp. 744-747.

Alferness et al., "Waveguide Electro-Optic Polarization Transformer", *Applied Phys. Letters*, vol. 38, No. 9, May 1, 1981, pp. 655-657.

"Polarization Modulation of Light in a Multimode Waveguide", Bykov et al., Sov. Tech. Phys. Lett., 6 (1), Jan., 1981.

Mark Johnson, "In-Line Fiber-Optical Polarization Transformer", *Applied Optics*, vol. 18, No. 9, May 1, 1979.

"Fabrication of Polarization-Maintaining Fibres Using Gas-Phase Etching", Birch et al., Electronic Letters, Nov. 25, 1982, vol. 18, No. 24, pp. 1036-1038.

"Acousto-Optic Frequency Shifer for Single Mode Fibers", Nosu et al., pp. 36-37, No. 29C5-3.

"Acoustooptic Phase Modulator for Single Mode Fibers", Nosu et al., pp. 316-317, No. 28C3-5.

K. Nosu, et al., "Acousto-Optic Frequency Shifter for Single-Mode Fibers," *Electronics Letters*, vol. 19, No. 20, Sep. 29, 1983.

F. Heisman et al., "Integrated-Optical Single-Sideband Modulator and Phase Shifter," *IEEE Journal of Quantum Electronics*, vol. QE 18, No. 4, Apr. 1982, pp. 767-771.

R. Ulrich et al., "Single-Mode Fiber-Optic Polarization Rotator," *Applied Optics*, vol. 18, No. 11, Jun. 1, 1979, pp. 1857-1861.

BIREFRINGENT FIBER NARROWBAND POLARIZATION COUPLER AND METHOD OF COUPLING USING SAME

This application is a continuation of application Ser. No. 556,305, filed 11/30/83.

BACKGROUND OF THE INVENTION

The invention relates generally to the field of fiber optic directional couplers, and more specifically, to devices which couple light energy between the polarization modes of an optical fiber.

It is useful to be able to convert light traveling in an optical fiber from one waveguide to another dissimilar waveguide, i.e., one with different propagation characteristics. If this transfer can be caused by some physical phenomena, a sensor can be made. In fiber optics, a single birefringent fiber can be thought of as two dissimilar waveguides in that such fiber can guide light and maintain its polarization in either of two independent polarization modes. To be able to control power transfer between these two modes is highly desirable.

Such coupling in the microwave art has been achieved by placing dissimilar waveguides side by side and drilling holes in the common wall at a periodic spacing equal to the beat length. The beat length is the distance it takes two signals of the same frequency traveling at different velocities in different waveguides, or at different modal velocities in the same waveguide, to shift 360 degrees in relative phase. The holes in the waveguides are spaced at the beat length causing additive coupling to occur between waveguides resulting in power transfer. This result follows from a principle of quantum mechanics called conservation of momentum.

Similar results have been obtained in integrated optics where lithium niobate crystals with diffused titanium waveguides have electrodes placed on the waveguide at a spaced equal to the beat length. Lithium niobate is naturally birefringent. Electric potential of alternating polarity is applied periodically every half beat length by the electrodes which causes changes in the axes of birefringence by electroptic effect in the waveguide. These changes may or may not be abrupt, but probably are not abrupt. The abruptness of the changes in the birefringence axes is important to substantial power transfer. The change in the properties of the material caused by the alternating electric fields causes coupling of power from one polarization mode to the other at each point of perturbation.

Such lithium niobate structures are lossy however and have not exhibited transfer ratios of greater than 25 dB. Losses can be as much as 1 dB in the crystal. Further losses occur at splices between fiber waveguides and the lithium niobate at both the input and output ports. Such losses can impair the performance of the system in which the crystal is used. Further, the beat length of lithium niobate is on the order of a few hundred microns, so complex photolithography techniques must be used for deposition of the electrodes.

Accordingly, a need arose for a simple, all fiber device which can control the transfer of power between polarization modes.

SUMMARY OF THE INVENTION

A four port directional coupler apparatus for controlling the transfer of power between dissimilar, linear, low loss waveguides and a method for causing such a transfer is disclosed. The dissimilar waveguides are the two orthogonal polarization modes of a single high birefringence monomode optical fiber waveguide which is capable of maintaining the polarization of light traveling therein over long distances.

A plastic block with ridges machined thereon and a polished, flat surface are used to exert mechanical stress on a fiber. The ridges are one-half beat length wide and are separated by one-half beat length. In other embodiments, the ridges could be any odd multiple of one-half beat length and the separation could be any odd multiple of one-half beat length. The purpose of this stress is to abruptly change the orientation of the birefringence axes of the fiber at periodic locations matching the one half beat length points.

Optical power is transferred by pressing the ridges against the fiber which is resting on the polished, flat surface. The fiber must be oriented such that the principal axes of birefringence are at some appreciable angle to the direction of the physical stress vector. Any angle between 0° and 90° between the stress vector and either of the principal axes of birefringence will work, but 45° will give the maximum coupling. Surprisingly, the ridges cause the orientation of the axes of birefringence to shift abruptly at the edges of each of the ridge surfaces. The periodic abrupt shifting of the birefringent axes for an odd multiple of one half beat length caused by application of stress and then reversion of the axes to their original states for an odd multiple of one half a beat length by the removal of stress can cause substantially all the power launched in one polarization mode at the input of the device to be transferred to the orthogonal polarization mode at the output of the device.

The bandwidth of the device can be adjusted by changing the number of ridges. A larger number of ridges leads to a more narrow bandwidth.

DETAILED DESCRIPTION OF THE PREFERRED EMBODIMENT

Figure 1:
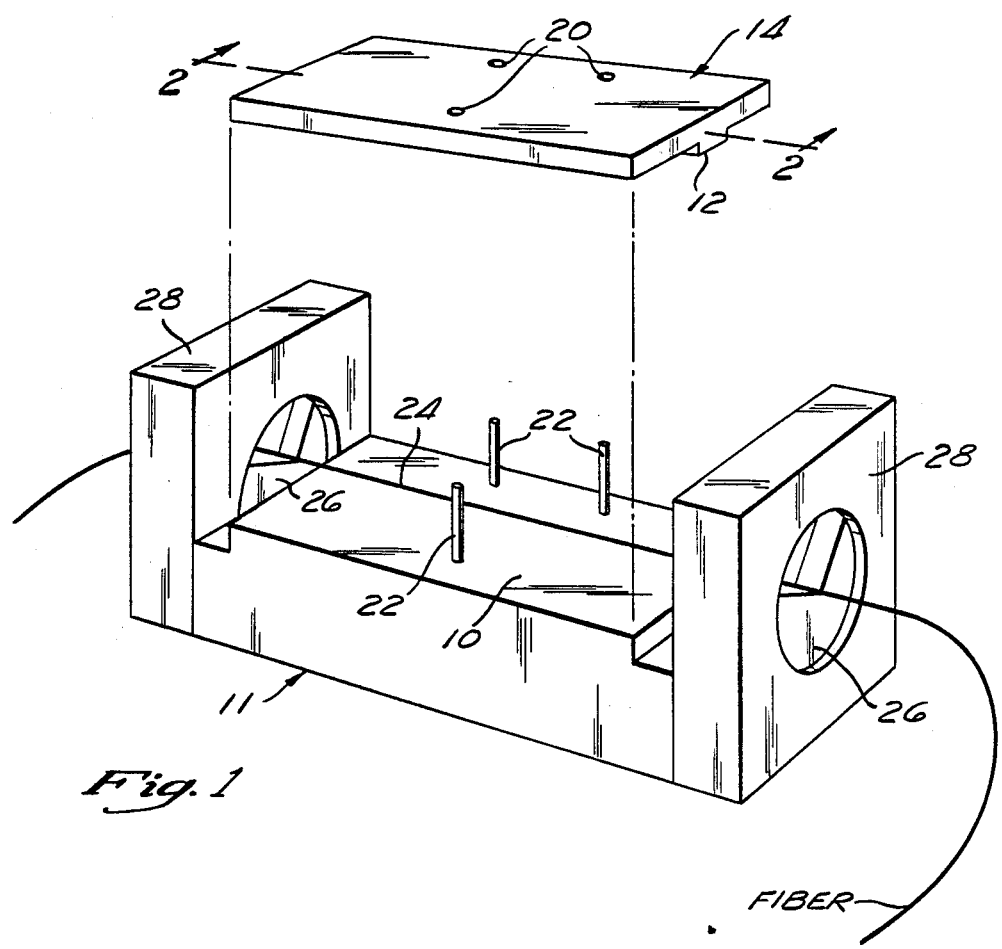
FIG. 1 is an exploded, perspective view of the narrowband directional coupler.

FIG. 1 shows the apparatus of the invention in perspective view. A polished, flat surface 10 is machined on a metal or plastic block 11. The surface 10 should be smooth and flat support to within a few microns. The surface 10 serves as the first of two surfaces between which an optical fiber waveguide will be squeezed.

Figure 2:
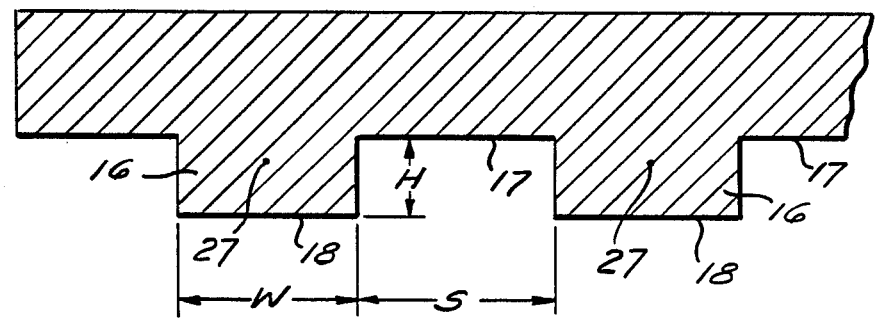
FIG. 2 is a cross section along the section line 2—2 in FIG. 1 showing the shape of the ridges.
Figure 3:
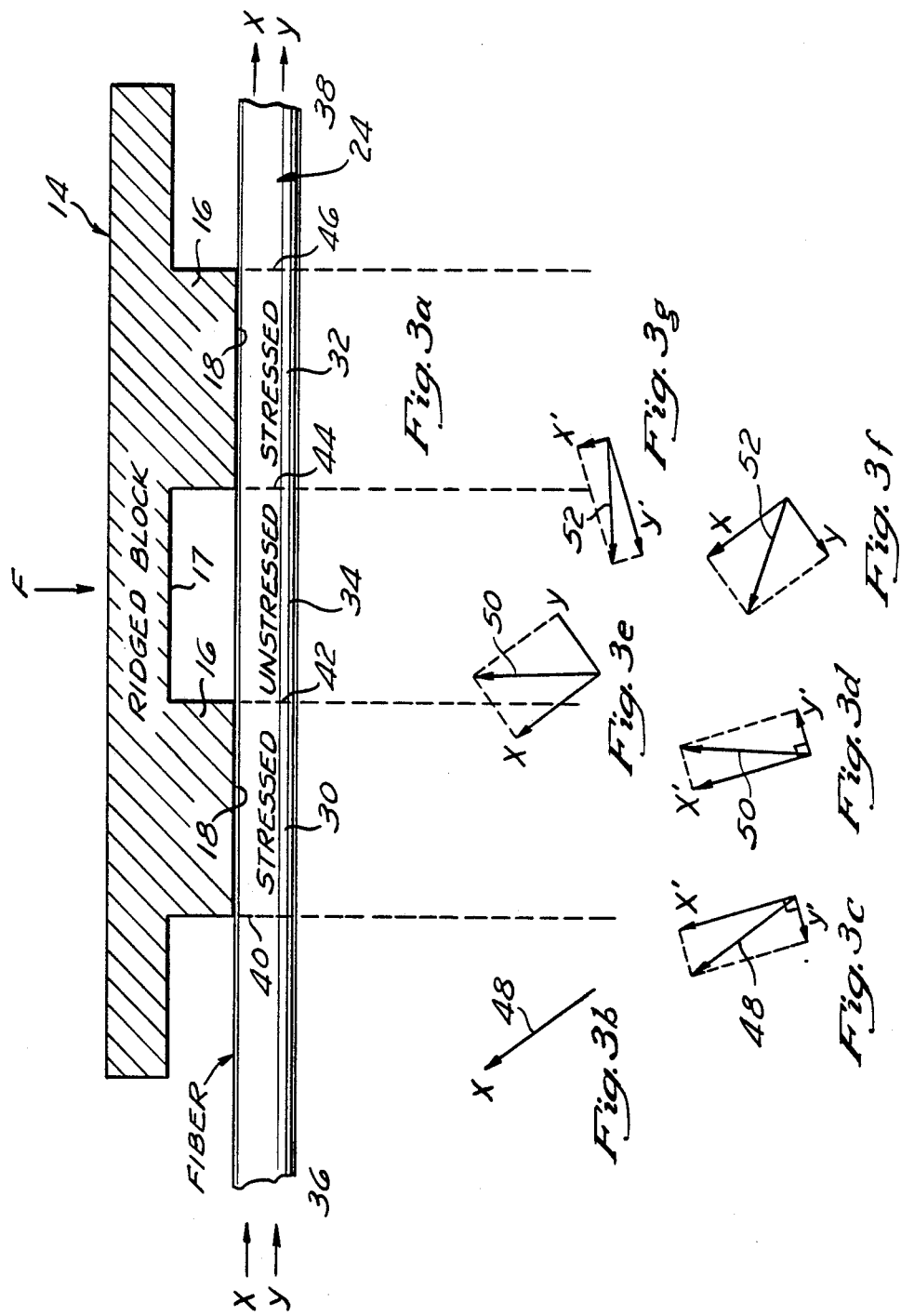
FIGS. 3(a)–3(g) show a diagram of the stressed regions in the fiber and the amount of power in the various polarization modes at various points along the fiber.

The second surface is a multiple ridge region 12 machined on the under surface of a second block 14. As discussed hereinafter, the ridges 12 provide coupling elements which, when pressed against the fiber, stress the fiber to cause light to be coupled between the modes. Referring momentarily to FIG. 2 there is shown a cross section of the ridged region 12 in which a plurality of ridges 16 are formed. The ridges 16 are formed by machining the block 14 to provide spaced, parallel notches or grooves 17, such that there is formed a plurality of polished ridge surfaces 18 having a width W and a separation S between the edges of adjacent ridges. To obtain maximum coupling for a given force exerted on the fiber, the width W between the edges of each ridge should be one half the beat length of the fiber for light at the particular frequency which is utilized.

Beat length is related to the property of light in birefringent fibers to travel at different velocities in different polarization modes thereby causing the relative phase between light in one mode to shift continuously from the phase of light traveling in the other mode. Thus, two components of a light wave which start in phase but which travel in different polarization modes in monomode fiber will slowly separate in phase until one component has fallen behind by 360 degrees at which time the two components will again be in phase. One beat length will have been traveled at such a point. After traveling one half of a beat length, the two components will be separated by 180 degrees or $\pi/2$ radians.

In the embodiment shown, the separation distance S at the ridges equals their width W. Any off multiple of one-half beat length will work for the dimensions W and S. That is, each ridge can be any odd multiple of one-half beat length and each separation can be any odd multiple of one-half beat length. The cross section of the notches 17 in the preferred embodiment is rectangular because that is the easiest shape to machine. However, this shape is not critical; any shape which yields a flat surface 18 on the ridges 16 with a width W of one-half beat length and edge separations of one-half beat length will be satisfactory, providing the height H of the notch 17 is sufficient to maintain stress when the material of the ridge 16 is deformed by the application of stress to a fiber. In the preferred embodiment, the block 14 is made of a hard plastic, Deltrin TM. This plastic deforms more readily than glass; thus, when the ridges are pressed onto a glass fiber the ridges have been found to deform a small amount. It is preferably that for the required amount of pressure to cause complete power transfer, that the ridges not deform so much as to become flat such that stress is uniformly exerted all along the fiber. It is critical that there be periodic regions of stress and no stress in the fiber. In the preferred embodiment, each of these regions should be an exact odd multiple one-half beat length in width to maximize the coupling. Incomplete power transfer will result if this geometry is not achieved but some coupling might still occur depending upon the exact geometry and force applied.

It has been found that a deformable plastic is preferred for the ridges 16, because a metal ridge will not deform as much when pressure is applied creating the danger that a metal ridge might break the fiber. Deformability of the ridge lessens this danger. Returning to FIG. 1, the block 14 has a plurality of holes 20 which are spaced in a pattern to receive a set of pins 22 projecting from the flat surface 10 in a matching pattern. The block 14 may be slid toward and away from the flat surface 10 along the pins 22. The pins are so aligned that the edges of ridges 16 are transverse to the longitudinal axis of a fiber 24 which is held on the flat surface 10 by a pair of fiber holding plates 26. Thus, the longitudinal axes of the ridges 16, illustrated by the reference numeral 27 in FIG. 2, are transverse to the longitudinal axis of the fiber 24. The pins 22 also serve to prevent rocking of the block 14 to prevent uneven pressure from being applied to the fiber 24.

The fiber holding plates 26 are rotatable relative to the flat surface 10 by virtue of being mounted in a pair of circular apertures formed in a pair of end plates 28. The holding plates are rotatable to allow the fiber to be rotated such that one of the principal axes of birefringence in the fiber can be oriented at an angle, preferably 45°, to the direction of the applied force exerted by the ridges 16. This will be explained in more detail below. The angle 45° is preferred, because maximum shifting of the axes of birefringence for a given force is obtained at that angle. The end plates 28 are mounted to the block 11, at the ends thereof, so that the plates 28 are perpendicular to the flat surface 10.

Figure 4:
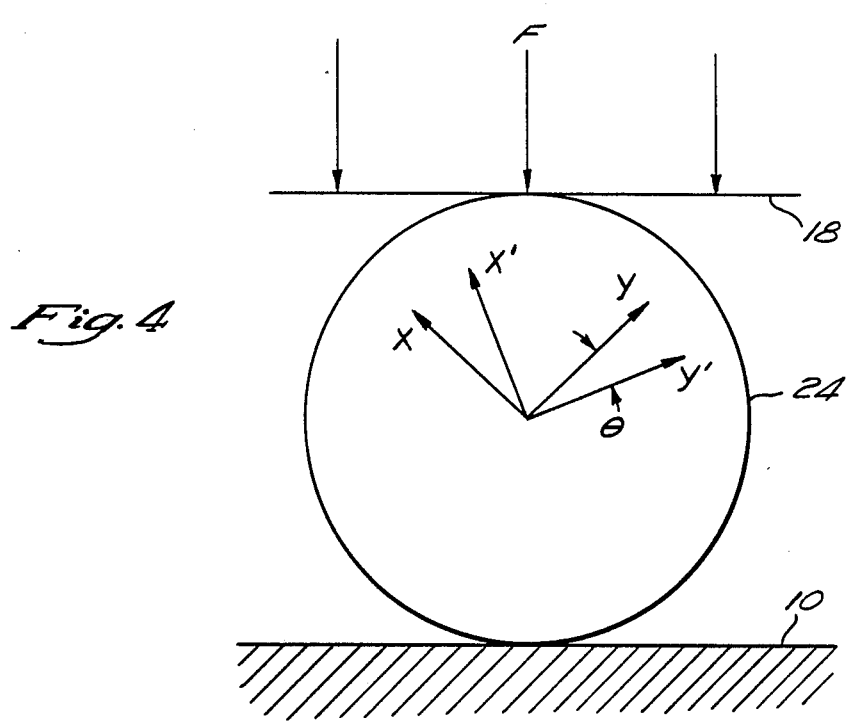
FIG. 4 shows the effect on the axes of polarization in a birefringent fiber when stress is applied.

Referring to FIGS. 3(a)–3(g), there is shown a diagram of the stress regions in the fiber 24 when the block 14 is pressed down with a total force F, so that the fiber 24 is squeezed between the surfaces 18 of the ridges and the surface 10 of the lower block. Also shown in FIGS. 3(b)–3(g) are vector diagrams of the amount of optical power on each of the axes of birefringence, i.e., polarization modes, at various points along the fiber. Referring also to FIG. 4, there is shown a diagram of how the axes of birefringence of the fiber 24 are changed by the application of stress. Those skilled in the art will understand that a single mode birefringent fiber, such as the fiber 24, has two orthogonal axes of polarization which correspond to the two orthogonal polarization modes of a single mode fiber.

FIG. 3(a) shows three regions of alternating stress and no stress caused by two of the ridges 16. Each of the stressed regions 30 and 32 is one-half beat length long in this embodiment. The same is true for the unstressed region 34. The fiber 24 can be thought of as a four-port device functionally analogous to a directional coupler coupling dissimilar waveguides. For example, the two orthogonal X and Y polarization modes of the fiber 24, shown schematically at 36, are analogous to the two input ports of such a directional coupler. Similarly, the X and Y orthogonal polarization modes, shown schematically at 38, are analogous to the output ports of such a directional coupler.

When stress is applied to the fiber 24, as represented by the force F in FIG. 4 pushing the surface 18 against the birefringent fiber 24, the applicant found that the orthogonal axes of polarization X and Y (which correspond to the polarization modes X and Y) abruptly shifted through an angle Theta to orthogonal axis of polarization X' and Y'. This abrupt shift was quite unexpected, since it was believed that stress applied by the surfaces 18 would deform the fiber 24 so as to perturb the axes of polarization over a longer region than the width W of the surface 18 applying the stress. This would tend to cause a gradual shift in the orientation of the axes of polarization over a relatively long boundary region rather than an abrupt shift at the edges of the surfaces 18 of the ridges 16. Such a gradual rotation of the axes of polarization over a relatively long distance would not cause a significant power transfer, i.e., coupling between the polarization modes because the resultant polarization vector would merely follow the gradual shift in the axes of polarization, and substantially maintain its position relative thereto.

It is critical to the operation of the device that abrupt changes in the orientation of the polarization mode axes be caused so that such changes in the orientation occur over a very short boundary region. In the embodiment shown, these boundaries, represented by the dotted lines 40, 42, 44, 46 in FIG. 3(a) are formed by the edges of the relief areas 16, and thus, are periodically spaced at one-half the beat length. In other embodiments, the boundaries could be spaced at odd multiples of the beat length.

FIGS. 3(b)-3(g) show how these abrupt boundaries 40, 42, 44 and 46 in the fiber 24 cause power transfer. The electric field vector for the X-polarization mode (which corresponds to the X axis of polarization in a birefringent fiber) is labeled X in the unstressed region 34, and X' in the stressed regions 30, 32. Similarly, the electric field vector for Y-polarization mode (which corresponds to the Y-axis of polarization) is labeled Y in the unstressed region 34, and Y' in the stressed regions 30, 32. It will be understood that the X and X' vectors [FIGS. 3(b)-(g)], correspond to the X and X' axes (FIG. 4) of polarization, respectively, and the Y and Y' vectors [FIGS. 3(b)-(g)] correspond to the Y and Y' axes (FIG. 4) of polarization, respectively.

In FIG. 3(b) the input light is represented by the vector 48 as entering the fiber 24 with all power in the X polarization mode. This polarization is maintained as the light propagates up to the boundary 40 at the beginning of the first stressed region 30.

FIG. 3(c) shows the power components after the light has propagated just beyond the boundary 40 into the stressed region 30. At the boundary 40, the axes of polarization X and Y abruptly shift through an angle Theta (FIG. 4) to a new orientation X' and Y', as discussed above in reference to FIG. 4. These new polarization mode axes X' and Y' represent the orientations of the electric field vectors for the electromagnetic light waves traveling in these polarization modes. As in the X and Y orientation case, the light in the X' mode travels at a different velocity than the light in the Y' mode, since that is fundamental to the concept of birefringence. The overall polarization of the light then is the resultant vector based upon the components of power in the X' and Y' or X and Y axes.

It will be noted that in the stressed region 30, there first appears at the boundary 40 a component of power in the Y' polarization mode whereas before the boundary 40 there was no power in the Y mode. The reason for this stems from Maxwell's equations which are well known mathematical relationships which explain the behavior of electromagnetic fields at boundaries. A fundamental principle is that, at an abrupt boundary through which an electromagnetic field passes, the orientation and magnitude of the electric field vector, relative to a fixed observer, must be the same on either side of the boundary. In this case, the resultant polarization, i.e., the orientation of the electric field vector to the left of the boundary 40 is as shown by the vector 48 in FIG. 3(h). To the right of the boundary 40, the polarization axes X' and Y' are shifted so that to maintain the resultant polarization for the vector 48, there must be a small Y' component because X' is shifted from its orientation in the X mode. Thus some power is transferred from the X mode into the Y' mode at the boundary 40.

As the two Y' and X' components travel through the stressed region 30 they shift in relative phase by 180 degrees because the stressed region is one half a beat length long. The relative phase of the X' and Y' components at the left of the boundary 42 is as shown in FIG. 3(d). The 180 degrees phase shift is modeled by reversing the direction of the Y' component. The same result would be obtained if the 180° phase shift was modeled by reversing the direction of the X or X' vector and leaving the Y or Y' vector unchanged. As a consequence of this 180° phase shift, the resultant polarization vector 50 is shifted from the orientation of the vector 48.

At the boundary 42, the orientation of the polarization axes X' and Y' abruptly shifts back to the original orientation X and Y by virtue of the removal of stress. As the light travels across the boundary 42, the polarization represented by the vector 50 must be preserved. The situation to the right of the boundary 42, at the beginning of the region 34, is as shown in FIG. 3(e). However, because the shifting of the axes of polarization cause a concomitant shift in the direction of the component vectors representing power in the X and Y modes, the magnitude of the X and Y components must change to preserve the angle and magnitude of the overall electric field vector 50. By comparing FIGS. 3(b) and 3(e), it will be noted that the regions 30, 34 have caused a substantial increase in the magnitude of the Y component of power.

FIG. 3(f) represents the power components just to the left of the boundary 44 ending the unstressed region 34. The unstressed region 34 is also one-half beat length long and thus there will be another 180° phase shift between the X and Y components as they travel through the region 34. This phase shift is again modeled by reversing the direction of the Y component at the boundary 44, as shown in FIG. 3(f). By extension of the above discussion, it is apparent that the polarization axes will shift abruptly again at the boundary 44, from the X and Y orientation, back to the X' and Y' orientation (FIG. 4). This causes more power to be shifted into the Y' polarization mode, and it can be seen from FIG. 3(g) depicting the situation just right of the boundary 44, that to preserve the magnitude and angle of the resultant electric field vector 52 across the boundary 44, the magnitude of the Y' component in FIG. 3(g) must increase because of the shift in the angles of the X and Y axes to X' and Y'. Thus, it is seen that each boundary at an odd multiple of one-half beat length causes a certain amount of power to be coupled from one mode to the other. The power coupled at the boundaries 40,42,44,46 is additive, so that total amount of coupled power from one end of the fiber 24 to the other is cumulative. If the boundaries were other than at exact odd multiples of one-half beat length, the cumulative coupled power might still be non zero, but each boundary at other than an odd multiple might cause power to be coupled into the other mode which has a component which is out of phase with the power already coupled into the other mode. This out of phase coupled power would cancel some of the power already coupled. Whether the net coupled power was non zero would depend upon the exact locations of the boundaries and how much force was applied in each stressed region. In general, however, errors of e.g. on the order of 5-10% in the location of the boundaries may be tolerated without having a substantial adverse effect on the operation of the invention.

The system can be characterized mathematically as follows. Typically, for highly birefringent fiber, light propagating down one of the axes will not couple appreciably to the other axis. It has been demonstrated that an additional birefringence can be induced by applying pressure to the fiber. This birefringence is given by $$\Delta n_p = \frac{an^3 Cf}{2d} \quad (1)$$

where a is a constant equal to 1.58 for round fiber, n is the mean refractive index of the fiber, C is a piezooptical coefficient, f is the force per unit length applied to the fiber and d is the fiber cladding diameter. In calculations, the values n=1.46, C=5×10⁻¹² (MKS), and d=65 μm were used. For small forces the additional birefringence can be treated as a perturbation to the fiber's normal birefringence. For the purpose of analysis it is assumed that the applied force is at 45° to the fiber axes of birefringence. Applying the force at an angle of 45° to an axis of birefringence causes the maximum shift in the orientation of the birefringence axes per unit force. However, the angle is not critical and deviations from 45° can be adjusted for by increasing the applied force. The first order result of the perturbation of birefringence is rotation of the fiber's original axes of birefringence through a small angle. This small in birefringence does not significantly change the magnitude of the total fiber birefringence, $\Delta n$. The angle $\theta$ is given by $$\theta \sim \sin(\theta) = \left[ \frac{\Delta n_p^2}{2(\Delta n_p^2 + \Delta n^2 + \sqrt{2\Delta}\ n\Delta n_p)} \right]^{\frac{1}{2}} \quad (2)$$

The total birefringence, $\Delta n$, is assumed to be constant with wavelength; it can be measured by directly observing the beat length $L=\lambda/(\Delta n)$ of the fiber at a known vacuum wavelength, $\lambda$. The fiber used in the preferred embodiment had a measured $\Delta n=7.4\times 10^{-4}$.

Light originally polarized along the x axis will decompose into components polarized along the axes X' and Y' when entering a squeezed region. The relative phase of the light in the two polarizations will change by $\pi$ radians in half a beat length. If at this distance the force on the fiber is removed, the light will decompose back into components along the original axes with an amount $\cos^2(2\theta)$ in the X polarization and $\sin^2(2\theta)$ in the Y polarization. After traveling another L/2 distance the proper phase relationship in the two axes will be established such that a second stressed region will cause further power transfer. For a single L/2 length stressed region and L/2 unstressed region, a Jones matrix, T, can be written to describe the amplitude polarization transformation of this structure $$T = \begin{bmatrix} -\cos 2\theta & \sin 2\theta \\ -\sin 2\theta & -\cos 2\theta \end{bmatrix} \quad (3)$$

Repeating such a structure N times yields a total polarization transformation matrix $$T^N = \begin{bmatrix} (-1)^N \cos 2N\theta & (-1)^{N+1}\sin 2N\theta \\ (-1)^N \sin 2N\theta & (-1)^N \cos 2N\theta \end{bmatrix} \quad (4)$$

Therefore, complete coupling from one polarization to the other can be achieved by applying a force, F, to the N ridges such that $2N\theta = \pi/2$. For large N(>5) this optimal force is given by $$F \sim \frac{L\sqrt{2}\ \Delta n d\pi}{4an^3 C} \quad (5)$$

For example, if N=10 and L=32 mils, using the numbers given above a force of 177 grams would be needed for complete coupling.

In the device depicted in FIG. 1, the fiber jacket was removed from the fiber 24 to expose the fiber directly to the ridges. This may not be necessary in all cases.

Figure 5:
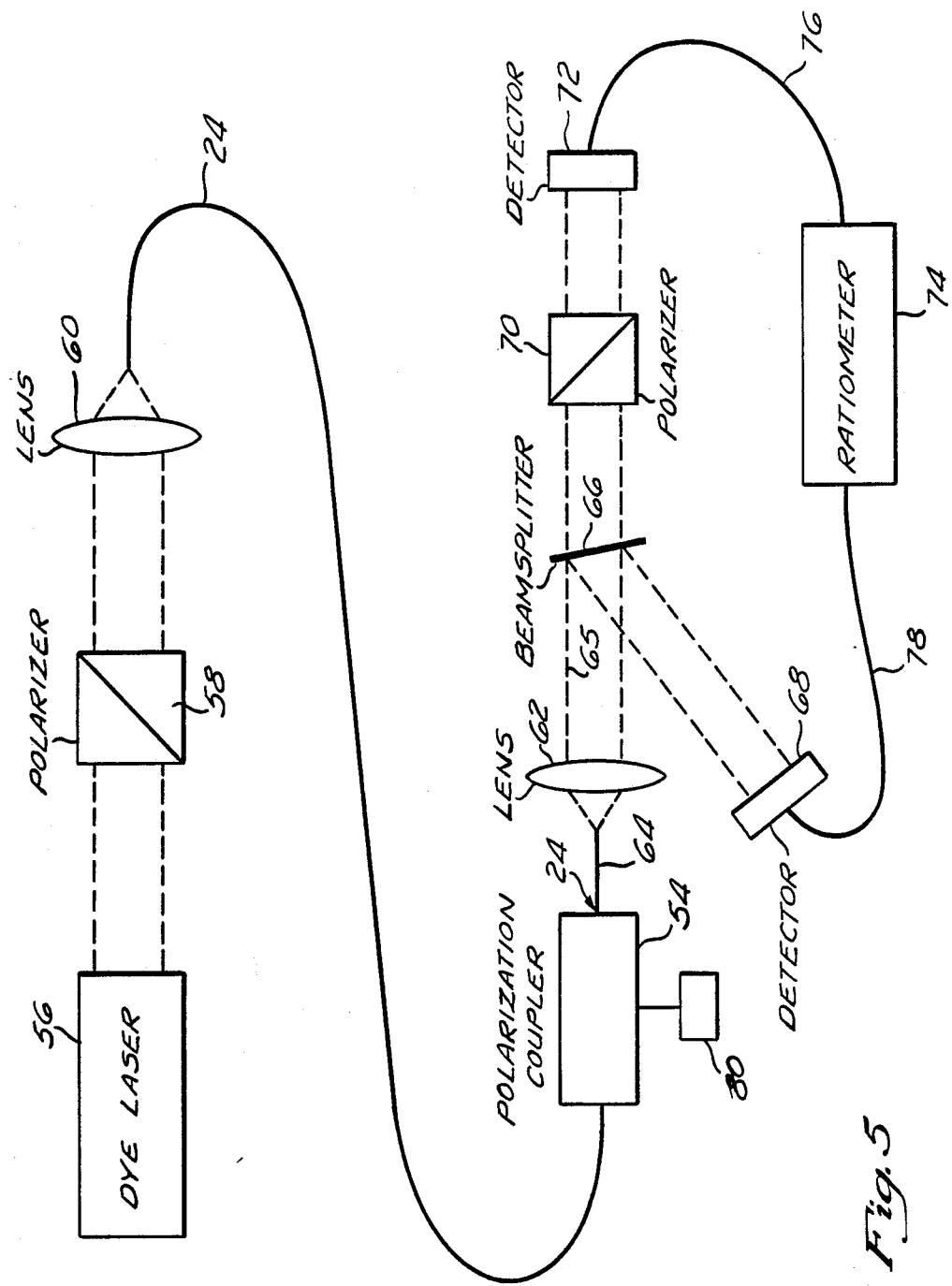
FIG. 5 is a diagram of a system using the coupler.

FIG. 5 shows a system using the polarization coupler described above in reference to FIGS. 1–4, labeled with the numeral 54. A frequency tunable dye laser 56 was used to generate the source light. This light, polarized by a standard polarizer 58, is launched into a length of elliptical core birefringent fiber 24 by a lens 60 which focuses the polarized light onto the core of the fiber. The polarizer 58 is aligned to pass light into only one of the two orthogonal polarization modes of the fiber 24. The light propagates into the fiber 24, through the polarization coupler 54, and has some or all of its power coupled into the other orthogonal polarization mode, upon exiting the fiber 24 at the fiber segment 64. A lens 62 collimates light emerging from the output fiber segment 64 and causes a beam 65 thus formed to fall on a beam splitter 66. The beam splitter 66 causes a part of the beam 65 to be directed to a standard photo-detector 68 and the remaining part of the beam 65 is passed through a polarizer 70. The polarizer 70 only passes light of the same polarization relative to the polarization established by the polarizer 58. The light passed through the polarizer 70 is impressed upon a standard photo-detector 72. The outputs of the detectors 72 and 68 are input, by lines 76, 78, respectively, to a standard ratiometer which indicates the relative power in the orthogonal polarization compared to the total output power. With the polarizer 70 at the output, an extinction ratio between the fiber polarizations of between 19 and 32 dB was measured. The extinction ratio is the logarithm to the base 10 of the ratio of the optical power in the vertical polarization mode to the optical power in the horizontal polarization mode. An extinction ratio of at least 19 dB was achieved regardless of wavelength when the wavelength was changed. It is believed that this limit is set by scattering loss in the fiber (>150 dB/km), because some of the scattered light remains guided. At certain wavelengths, the ratio improved up to 32 dB, probably due to destructive interference of the scattered light. When the ridged block 14 was placed on the fiber and pressure was applied, a coupling ratio greater than 32 dB was achieved, typically with a force of about 220 grams. The coupling ratio is the logarithm to the base 10 of the ratio between the optical power not coupled to the orthogonal polarization mode and the power that is coupled into the orthogonal mode. This ratio was observed with 10 ridges at 633 nm and with 30 and 60 ridges at about 608 nm light wavelength.

The ridges of the coupler of the present invention must be designed for a particular wavelength, because the beat length of the light in the fiber is not constant as a function of wavelength. When the device is used at a different wavelength, the phase shift, $\Delta\Phi$, over a ridge length changes from $\pi$ radians to $\pi + 2\delta$ radians. Consequently, complete power transfer can no longer take place. Assuming proper force applied by each ridge so that $2N\theta = \pi/2$, the transfer matrix over a single ridge and gap period becomes $$T = \begin{bmatrix} \sin^2\theta - \cos^2\theta e^{i2\delta} & \sin\theta \cos\theta[1 + e^{i2\delta}] \approx \\ -\sin\theta \cos\theta[1 + e^{-i2\delta}] \approx & \sin^2\theta - \cos^2\theta e^{-i2\delta} \end{bmatrix} \quad (6)$$

If the light is originally launched in only one polarization, after N ridges the power coupled into the second polarization is given by $|\Box|^2$, where $$\kappa = -\sin\theta \cos\theta \left[1 + e^{-i2\delta} \approx \left[\frac{\sin(N\cos^{-1}b)}{\sqrt{1-b^2}}\right] \approx \right. \quad (7)$$

where: $b = \sin^2\theta - \cos^2\theta \cos 2\delta$

The off diagonal elements of the transfer matrix represent the amount of amplitude coupling which will occur between polarization modes. This amplitude coupling, $\kappa$, is the value of each of the two off-diagonal matrix elements of $T^N$.

Figure 6:
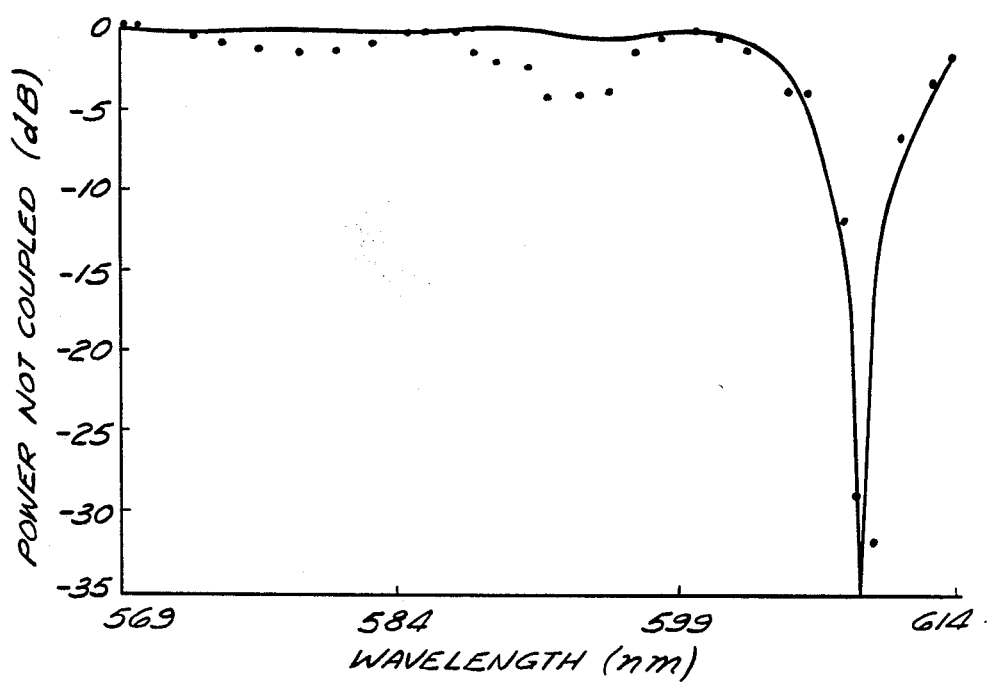
FIG. 6 is a graph of the experimentally determined coupling versus wavelength function compared to the theoretically predicted result.

The dependence of coupling on wavelength was investigated experimentally using a dye laser tunable between 569 nm and 614 nm. The device used was a 60 ridge coupler whose center wavelength was at 609 nm, to which uniform optical pressure was applied. The experimental setup was the same as shown in FIG. 5. The light left in the original polarization, i.e., not coupled, is the detected signal. The ratiometer 74 was used to compensate for laser power fluctuations as the wavelength was changed. The results are plotted in FIG. 6, which shows experimental results as dots, and the theoretical predicted results, based upon the abrupt shift in birefringence model assumed for the system, as a solid line. the good agreement between the two curves supports the conclusion that the changes in birefringence at the boundaries of the stressed regions are indeed abrupt. A full width at half maximum which is theoretically equal to approximately $\lambda/N$, was observed to be 9 nm. However, the side lobes were higher than predicted due to uneven pressure of the ridges on the fiber. This unequal pressure was probably caused by variations in the fiber diameter and ridge height on the order of angstroms, and can be dealt with by constructing individually weighted ridges. The width of the central peak indicates the potential of this polarization coupler for use as a multiplexer or notch filter.

The polarization coupler described with reference to FIGS. 1-6 above can be used as an amplitude modulator. By varying the force F in FIG. 3(a) in accordance with a modulating signal, a varying amount of power can be coupled from the X polarization mode to the Y polarization mode where the amount of coupling is proportional to the magnitude of the force F. That is, if any conventional transducer 80 in FIG. 5 is driven e.g. sinusoidally to vary the force F applied to the ridged block 14 of the polarization coupler 54, the optical power in the Y polarization mode of the fiber 24 will be directly proportional to the magnitude of the force F, where the input power is launched initially all in the polarization mode X. this can be seen from Equation 1 where it is seen that the additional birefringence induced by the stress is directly proportional to the force applied per unit of length. When the force varies, the angle through which the axes of the polarization modes shift changes per Equation 2. This changes the amount of power shifted between the polarization modes by changing the amount of power decomposing onto each of the new axes at each boundary as will be apparent from inspection of FIGS. 3(b)-3(g).

Although the invention has been described in terms of the preferred embodiment, many variations will be apparent to those skilled in the art. All such variations using the same principle are intended to be included within the appended claims.

What is claimed is:

1. A directional coupler apparatus, comprising:
   a monomode, polarization maintaining, birefringent optical fiber having first and second orthogonal polarization modes which correspond to first and second orthogonal axes of birefringence, respectively, said fiber having a beat length for said two modes; and
   a member having a plurality of elements, each of said elements having a surface for applying force to said fiber at an angle relative to said axes of birefringence, said elements spaced along said fiber to apply said force at plural intervals along said fiber, said intervals spaced by a dimension related to the beat length of said fiber such that said force causes cumulative transfer of power between said first mode and said second mode in said fiber.

2. A coupler apparatus, comprising:
   a monomode, polarization maintaining, birefringent optical fiber having first and second orthogonal polarization modes which correspond to first and second orthogonal axes of birefringence, respectively, said fiber having a beat length for said two modes; and
   a member with a plurality of spaced ridges thereon and a support surface, the fiber located between said ridged member and said support surface, such that force is applied to said fiber at an angle relative to said axes of birefringence at plural intervals along said fiber, said intervals spaced by a dimension related to the beat length of said fiber such that said force causes cumulative transfer of power between said first mode and said second mode in said fiber.

3. An apparatus as defined in claim 2, wherein each of said plurality of ridges has a surface having a width of half the beat length of the fiber from edge to edge and wherein the edges of adjacent ridges are separated by one-half a beat length of the fiber.

4. An apparatus as defined in claim 2, wherein said ridges have a rectangular cross section.

5. An apparatus as defined in claim 2, wherein said ridges are formed of a deformable plastic so that said ridges deform when pressed against said fiber, said ridges having a height greater than the deformation of the plastic when the ridge is pressed against said fiber.

6. An apparatus as defined in claim 3, wherein said support surface and said surfaces of said ridges are polished.

7. An apparatus as defined in claim 2, wherein said fiber has a longitudinal axis and wherein said applying means includes fiber holding plates which are rotatable relative to said support surface such that a fiber held on said support surface by said plates can be rotated about the longitudinal axis of the fiber.

8. An apparatus as defined in claim 2, wherein said support surface has pins projecting therefrom which are received in holes in said ridged member such that said ridges can be slid toward and away from said support surface on said pins.

9. An apparatus as defined in claim 2, wherein said ridges have corresponding leading edges relative to the direction of light propagation through said fiber, the spacing between leading edges of said ridges equal to the beat length of said fiber.

10. A coupler apparatus, comprising:
- a monomode, polarization maintaining, birefringent optical fiber having first and second orthogonal polarization modes which correspond to first and second orthogonal axes of birefringence, respectively, said fiber having a beat length for said two modes; and
- a member having a periodically varying surface for applying force to said fiber at an angle relative to said axes of birefringence at plural intervals along said fiber, said intervals spaced by a dimension related to the beat length of said fiber such that said force causes cumulative transfer of power between said first mode and said second mode in said fiber.

11. A coupler apparatus, comprising:
- a monomode, polarization maintaining, birefringent optical fiber having first and second orthogonal polarization modes which correspond to first and second orthogonal axes of birefringence, respectively, said fiber having a beat length for said two modes; and
- a member having a periodically varying surface for applying force to said fiber at an angle of approximately 45° relative to said axes of birefringence at plural intervals along said fiber, said intervals spaced by a dimension related to the beat length of said fiber such that said force causes cumulative transfer of power between said first mode and said second mode in said fiber, said applying means shifting said axes of birefringence, and said cumulative power transfer occurring at a point where the axes of birefringence are shifted.

12. A coupling device, comprising:
- a polarization maintaining, high birefringence, monomode optical fiber having a longitudinal axis, said fiber also having a predetermined beat length and two axes of birefringence;
- a flat surface;
- an orientation device for holding said fiber on said flat surface in a selectable angular orientation of said axes of birefringence relative to a normal vector to said surface; and
- a member having a plurality of ridges thereon spaced linearly at odd multiples of one-half the beat length of said fiber for applying force to said fiber, said device orienting said fiber such that said ridges apply said force at an angle to said axes of birefringence to abruptly shift the axes of birefringence at odd multiples of one-half beat length to cause light propagating in said fiber to be cumulatively coupled from one polarization mode to another polarization mode of said fiber.

13. A coupling apparatus, comprising:
- a polarization maintaining monomode optical fiber having orthogonal axes of birefringence; and
- a member for applying force to said fiber at an angle relative to said orthogonal axes of birefringence to abruptly shift the orientation of the axes of birefringence along said fiber, said member including a plurality of flat surfaces having a length substantially equal to an odd multiple of one-half beat length of the fiber, said surfaces being spaced at a spacing equal to an odd multiple of substantially one-half the beat length of the fiber such that the axes of birefringence are shifted from a first orientation to a second orientation during a first odd multiple of substantially one-half beat length and are shifted back to said first orientation during a second odd multiple of one-half beat length, said shifting of said axes causing light to be cumulatively coupled from one polarization mode to another polarization mode of said fiber.

14. An apparatus as defined in claim 12, wherein the number of ridges is selected to achieve a predetermined bandwidth.

15. A method of manufacturing a coupling device for coupling optical power launched into one polarization mode of a birefringent, polarization maintaining fiber from said one polarization mode, into an orthogonal polarization mode, said fiber having predetermined axes of birefringence, said method comprising:
- forcing a surface against said fiber at an angle relative to said predetermined axes of birefringence to alter the orientation of the axes of birefringence at plural locations along said fiber to cause said optical power to couple to said orthogonal mode at each of said plural locations; and
- spacing said locations to cause said coupling at said locations to be cumulative.

16. The method of claim 15, wherein the step of forcing a surface against said fiber to alter the orientation of the axes of polarization includes the step of maintaining a static force on said fiber to cause said predetermined axes of birefringence to shift at said plural locations by a fixed amount.

17. A coupling apparatus, comprising:
- a single, birefringent, polarization conserving monomode optical fiber having first and second predetermined orthogonal axes of birefringence and corresponding polarization modes, said fiber having a beat length for light propagating in said modes;
- means for stressing said fiber at a series of preselected regions along said fiber, said stressing means comprising means for forcing a surface against said fiber, said regions being arranged in accordance with said beat length of said fiber to cause cumulative power transfer of light between one of said polarization modes and the other of said polarization modes.

18. The apparatus of claim 17, wherein each region has a beginning and an end, the beginnings of said regions spaced by one beat length of said fiber.

19. The apparatus of claim 17, wherein the length of each of said regions is any odd multiple of one-half beat length.

20. A coupler apparatus, comprising:
- a birefringent monomode optical fiber having two axes of birefringence throughout the length of said fiber, and having two polarization modes corresponding to said axes;
- means for stressing said optical fiber to form a series of stressed regions at spaced intervals along said optical fiber, said stressing means adapted to apply a unidirectional force to said fiber at each of said stressed regions, said force being in a direction which is at an angle relative to the axes of birefringence such that the axes of birefringence of said fiber are shifted at said stressed regions, the spacing between said spaced intervals being selected in accordance with the beat length of the fiber to cause cumulative power transfer between said modes.

21. An apparatus as defined in claim 20, wherein said regions are spaced to provide a preselected phase shift between light in first and second polarization modes of said fiber.

22. An apparatus as defined in claim 20, wherein the spacing between said spaced intervals is equal to a multiple of one beat length.

23. An apparatus as defined in claim 20, additionally comprising modulation means for driving said stressing means in accordance with a modulating signal to oscillate the force on said stressed regions.

24. A method of coupling light between polarization modes of a birefringent monomode optical fiber, comprising:
   stressing a birefringent optical fiber at a number of preselected locations along its length to cause power transfer between first and second polarization modes of said fiber; and
   selecting the number of said preselected locations to achieve a predetermined bandwidth for said power transfer.

25. A method of coupling light between modes of a birefringent, monomode optical fiber, comprising:
   introducing light into a mode of said birefringent, monomode fiber;
   applying a surface having periodic variations to said fiber such that said periodic variations of said surface stress said fiber at a first region and at a second region, said first and second regions separated by a third region, said stressing causing power transfer between said modes in each of said first and second regions, the dimensions of said regions selected to cause said power transfer between said modes to be cumulative as light propagates through said fiber.

26. A method of coupling light between modes of a birefringent, monomode optical fiber, comprising:
   introducing light into one mode of said birefringent, monomode fiber; and
   stressing said fiber at a first region and at a second region by applying a time varying stress to said fiber, said first and second regions separated by a third region, said stressing causing power transfer between said modes in each of said regions, the dimensions of said regions selected to cause a predetermined phase shift in each of said regions which causes said power transfer between said modes to be cumulative as light propagates through said fiber.

27. A method of coupling light as defined by claim 26, wherein said time varying stress is the same at both of said first and second regions.

28. In a polarization maintaining, birefringent optical fiber, having first and second orthogonal polarization modes which correspond to first and second orthogonal axes of birefringence, respectively, a method of coupling light between said modes, comprising:
   introducing a lightwave into said polarization maintaining, birefringent optical fiber, said fiber having a beat length between said modes for said lightwave;
   utilizing a surface having periodic variations to apply force to said fiber asymmetrically to perturb said axes of birefringence at plural intervals along said fiber; and
   spacing said intervals in accordance with said beat length to cause cumulative power transfer between said modes at said intervals.

29. A method of coupling light as defined by claim 28, wherein the force at each of said intervals is static.

30. In a polarization maintaining, birefringent optical fiber, having first and second orthogonal polarization modes which correspond to first and second orthogonal axes of birefringence, respectively, a method of coupling light between said modes, comprising:
   introducing a lightwave into said polarization maintaining, birefringent optical fiber, said fiber having a beat length between said modes for said lightwave;
   applying a time varying force to said fiber asymmetrically to perturb said axes of birefringence at plural intervals along said fiber; and
   spacing said intervals in accordance with said beat length to cause cumulative power transfer between said modes at said intervals.

31. In a polarization maintaining, birefringent optical fiber, having first and second orthogonal polarization modes which correspond to first and second orthogonal axes of birefringence, respectively, a method of coupling light between said modes, comprising:
   introducing a lightwave having plural wavelengths into said polarization maintaining, birefringent optical fiber, said fiber having a beat length between said modes for said lightwave;
   applying force to said fiber asymmetrically to perturb said axes of birefringence at plural intervals along said fiber;
   spacing said intervals in accordance with said beat length to cause cumulative power transfer between said modes at said intervals; and
   selecting said intervals to provide wavelength filtering, such that said cumulative power transfer is substantially greater for one of said wavelengths than for another of said wavelengths.

32. A method of coupling light as defined by claim 31, additionally comprising selecting the number of said intervals to yield a predetermined filter characteristic for said wavelength filtering.

33. a coupler apparatus, comprising:
   a monomode, polarization maintaining, birefringent optical fiber having first and second orthogonal polarization modes which correspond to first and second orthogonal axes of birefringence, respectively, said fiber having a beat length for said modes; and
   a member oriented to apply force to said fiber at an angle relative to said axes of birefringence, said member applying said force at plural intervals along said fiber, said intervals spaced by a dimension related to the beat length of said fiber such that said force causes cumulative transfer of optical power between said first mode and said second mode of said fiber.

34. A method of coupling light between a first mode of a monomode, polarization maintaining, birefringent optical fiber and a second mode of said fiber, said first and second modes corresponding to first and second orthogonal axes of birefringence, respectively, said fiber having a beat length for said modes, said method comprising:
   applying force to said fiber at an angle relative to said axes of birefringence at plural intervals along said fiber; and
   spacing said intervals in accordance with the beat length of said fiber such that said force causes cumulative transfer of optical power between said first and mode and said second mode of said fiber.

* * * * *

UNITED STATES PATENT AND TRADEMARK OFFICE
CERTIFICATE OF CORRECTION

PATENT NO.   : 4,801,189

DATED        : January 31, 1989

INVENTOR(S)  : Herbert J. Shaw, Robert C. Youngquist, Janet L. Brooks

It is certified that error appears in the above-identified patent and that said Letters Patent is hereby corrected as shown below:

In the Abstract, at line 10, change "ridges in also one-half" to --ridges is also one-half--.

In Column 1, at line 39, change "spaced equal" to --spacing equal--.

In Column 2, at line 56, change "A polished, flat surface" to --A polished, flat support surface--.

In Column 2, at line 58, change "smooth and flat support to within a few microns" to --smooth and flat to within a few microns--.

In Column 3, at line 24, change "Any off multiple" to --Any odd multiple--.

In Column 5, at line 55, change "Fig. 3(h)" to --Fig. 3(b)--.

In Column 9, at line 9, change "given by $|\Box|^2$" to --given by $|\kappa|^2$--.

In Column 14, at line 67, change "said first and mode and said second mode" to --said first mode and said second mode--.

Signed and Sealed this

First Day of September, 1992

*Attest:*

DOUGLAS B. COMER

*Attesting Officer*   Acting Commissioner of Patents and Trademarks